United States Patent
Clement et al.

(10) Patent No.: US 6,642,423 B2
(45) Date of Patent: Nov. 4, 2003

(54) POLYMERIZATION OF ETHYLENE OXIDE USING METAL CYANIDE CATALYSTS

(75) Inventors: Katherine S. Clement, Lake Jackson, TX (US); Louis L. Walker, Clute, TX (US); Richard M. Wehmeyer, Lake Jackson, TX (US); Robert H. Whitmarsh, Lake Jackson, TX (US); David C. Molzahn, Midland, MI (US); William P. Dianis, Midland, MI (US); David E. Laycock, Sarnia (CA); John W. Weston, Sugar Land, TX (US); Richard J. Elwell, Stade (DE)

(73) Assignee: Dow Global Technologies, Inc., Midland, MI (US)

( * ) Notice: Subject to any disclaimer, the term of this patent is extended or adjusted under 35 U.S.C. 154(b) by 0 days.

(21) Appl. No.: 10/131,900

(22) Filed: Apr. 24, 2002

(65) Prior Publication Data

US 2002/0198413 A1 Dec. 26, 2002

Related U.S. Application Data

(63) Continuation-in-part of application No. 09/611,499, filed on Jul. 7, 2000, now Pat. No. 6,429,342.
(60) Provisional application No. 60/205,771, filed on May 19, 2000, provisional application No. 60/143,075, filed on Jul. 9, 1999, provisional application No. 60/143,078, filed on Jul. 9, 1999, provisional application No. 60/143,079, filed on Jul. 9, 1999, provisional application No. 60/143,081, filed on Jul. 9, 1999, and provisional application No. 60/143,082, filed on Jul. 9, 1999.

(51) Int. Cl.[7] ........................... C07C 43/11; C07C 43/18

(52) U.S. Cl. .................. 568/616; 568/618; 568/619; 568/620

(58) Field of Search .............................. 568/616, 618, 568/619, 620

(56) References Cited

U.S. PATENT DOCUMENTS

| | | | |
|---|---|---|---|
| 4,456,773 A | 6/1984 | Fock | 568/608 |
| 4,877,906 A | 10/1989 | Harper | 568/621 |
| 4,985,491 A | 1/1991 | Reisch | 524/875 |
| 5,144,093 A | 9/1992 | Reisch et al. | 568/621 |
| 5,563,221 A | 10/1996 | Pazos | 525/409 |
| 5,856,369 A | 1/1999 | Jorgenson et al. | 521/112 |

FOREIGN PATENT DOCUMENTS

| | | | |
|---|---|---|---|
| JP | 3-244632 | 10/1991 | C08G/65/28 |
| JP | 8208426 | 8/1996 | A61K/7/00 |
| WO | 99/10407 | 3/1999 | C08G/65/10 |

OTHER PUBLICATIONS

U.S. patent application Ser. No. 60/205,772, Clement et al., filed May 19, 2000.
U.S. patent application Ser. No. 60/205,718, Clement et al., filed May 19, 2000.
U.S. patent application Ser. No. 60/205,773, Clement et al., filed May 19, 2000.

*Primary Examiner*—Samuel Barts
*Assistant Examiner*—Sikarl A. Witherspoon

(57) ABSTRACT

Ethoxylations of various initiator compounds are performed in the presence of metal cyanide catalysts. The catalysts surprisingly form a wide variety of polyether products that in most cases contain only small amounts of high molecular weight poly(ethylene oxide).

9 Claims, No Drawings

POLYMERIZATION OF ETHYLENE OXIDE USING METAL CYANIDE CATALYSTS

CROSS-REFERENCE TO RELATED APPLICATIONS

This application is a continuation-in-part of application Ser. No. 09/611,499, filed Jul. 7, 2000 now U.S. Pat. No. 6,429,342 (equivalent to WO 01/04183, published Jan. 18, 2001), which claims benefit of provisional application No. 60/205,771, filed May 19, 2000 and provisional application Nos. 60/143,075, 60/143,078, 60/143,079, 60/143,081 and 60/143,082, all filed Jul. 9, 1999.

BACKGROUND OF THE INVENTION

This invention relates to processes for preparing poly (oxyethylene) polymers and to methods for preparing same.

Polymers of ethylene oxide are well known and useful in a number of applications such as detergent and cleaner compositions, oil well drilling fluids, inks, metal working fluids, lubricants in paper coating compositions, ceramics manufacturing, chemical intermediates for organic nonionic surfactants which in turn are used in cosmetics, textiles and chemical processing, polyurethanes which are used as flexible foams and elastomers, chemical intermediates for esters which are used in textile spin finishes, manufacturing cosmetic agents, and foam control agents for a wide variety of processes. These polymers may have no more than one oxyethylene group in succession, or be a higher molecular weight polymer containing one or more long chains of consecutive oxyethylene groups.

Poly(oxyethylene) polymers are commonly made through an anionic polymerization process, whereby ethylene oxide is combined with an initiator compound and a strongly basic catalyst such as potassium hydroxide or certain organic amines. The initiator compound contains one or more oxyalkylatable groups such as hydroxyl, thiol, carboxylic acid and the like. The initiator compound determines the functionality (i.e., number of hydroxyl groups/molecule of product) and in some cases may introduce some desired functional group into the product.

There are some disadvantages of polymerizing ethylene oxide using these strongly basic catalysts. One problem is that the strongly basic catalysts do not produce a low polydispersity product when a tertiary hydroxyl initiator compound is used. In addition, the basic catalyst usually must be removed from the product before it is used, which increases manufacturing costs. In addition, some kinds of initiator compounds cannot be ethoxylated using strongly basic catalysts because they contain base-sensitive functional groups.

In order to ethoxylate certain types of initiators that are sensitive to alkali and alkaline earth bases, Lewis acids such as boron trifluoride-diethyl etherate and organic amines such as triethylamine have been tried. However, some of these catalysts tend to promote the formation of large amounts of by-products, especially when it is attempted to add three or more moles of ethylene oxide per equivalent of initiator compound. The Lewis acid catalysts tend to catalyze "backbiting" reactions where the growing polymer chain reacts with itself to form cyclic ethers such as dioxane and various crown ethers. These cannot be removed easily from the desired product, and so the product cannot be used in many applications.

So-called double metal cyanide ("DMC") catalysts have been used in alkoxylation reactions to make polyols and polyesterethers. These catalysts are mainly of interest in polymerizing propylene oxide. This is because propylene oxide readily undergoes a rearrangement reaction in the presence of strong bases. The rearrangement reaction occurs at rates that approach or even exceed that of the desired propoxylation reaction. The practical result of this is that it is very difficult to prepare polypropylene oxide) polymers of above about 3000 equivalent weight in an anionic polymerization catalyzed with a strong base. Lower equivalent weight poly(propylene oxide) polymers can be made using strongly basic catalysts, but contain significant quantities of monofunctional impurities. Thus, DMC catalysis has focussed on polymerizing propylene oxide. In some cases, random copolymers of propylene oxide and ethylene oxide have been made with DMC catalysts by polymerizing mixtures of ethylene oxide and propylene oxide.

Poly(propylene oxide) polymers that are end-capped with poly(oxyethylene) blocks are important raw materials for making polyurethanes. Attempts have been made to produce these using DMC catalysts, and in particular to form the poly(oxyethylene) blocks through a DMC-catalyzed polymerization of ethylene oxide. These attempts have not been successful. Instead of forming terminal poly(oxyethylene) blocks on the polyol, the ethylene oxide instead mostly goes into forming a very high molecular weight poly(ethylene oxide) homopolymer. So, end-capping capping with polyethylene oxide is usually performed using a basic catalyst such as potassium hydroxide, although in some instances the DMC catalyst may also be present.

SUMMARY OF THE INVENTION

This invention is a process for preparing a polyether, comprising forming a mixture of an initiator compound having one or more oxyalkalatable groups, ethylene oxide and a metal cyanide catalyst complex, and subjecting the mixture to conditions sufficient to ethoxylate the oxyalkalatable groups of the initiator.

This invention permits the formation of initiated polymers of ethylene oxide. Surprisingly, the ethoxylation of initiator compounds proceeds well using a metal cyanide catalyst complex without forming large quantities of high molecular weight poly(ethylene oxide). Further, this invention permits the formation of several new classes of polyethoxylated initiator compounds that could not be made in good yield using strongly basic or Lewis acid type catalysts.

DETAILED DESCRIPTION OF THE INVENTION

In this invention, an initiator compound is ethoxylated by reaction with ethylene oxide in the presence of a catalytically effective amount of a metal cyanide catalyst. The ethoxylation is conducted by combining the initiator, metal cyanide catalyst and ethylene oxide and subjecting the mixture to conditions sufficient to polymerize the ethylene oxide. In this manner, the initiator compound becomes ethoxylated until poly(oxyethylene) chains of a desired length are produced. As discussed below, once polymerization has begun, other alkylene oxides can be polymerized and other types of monomers that are copolymerizable with alkylene oxides can be polymerized as well.

In most cases, a so-called "induction period" occurs at the beginning of the polymerization reaction, in which little or no polymerization occurs. Under ethylene oxide polymerization conditions, this is manifested by a period during which reactor pressure remains constant or decreases only slowly. The induction period may range from a few minutes to several hours, depending on the particular catalyst that is used and the temperature. During this induction period, the catalyst becomes activated and then rapid polymerization of the ethylene oxide commences.

It is believed that activation of the catalyst complex requires that it be exposed to an alkylene oxide. In the ordinary case, where a poly(oxyethylene) homopolymer is to be produced, the catalyst will be activated in the presence of ethylene oxide.

However, it is not necessary to use ethylene oxide to activate the catalyst. Propylene oxide and/or other alkylene oxides can be used if desired to activate the catalyst, at which point ethylene oxide is added to the reaction mixture and polymerized. In such cases, a certain amount of the other alkylene oxide will polymerize onto the initiator compound. It is believed that unless substantially all of the other alkylene oxide is consumed, subsequently added ethylene oxide will polymerize rapidly with little or no additional induction period. On the other hand, if the supply of the other alkylene oxide is exhausted, then a second induction period is often seen when ethylene oxide is added.

The starting mixture of catalyst, initiator compound and alkylene oxide is conveniently made by combining the catalyst and initiator compound in a pressure reactor (or by forming the catalyst in the initiator), and then pressurizing the reactor with an initial quantity of the alkylene oxide used to activate the catalyst. The induction period follows, as indicated by a nearly constant or slowly decreasing pressure in the reactor. The onset of rapid polymerization that follows the induction period is evidenced by a drop in pressure as the initial quantity of alkylene oxide is consumed.

The starting mixture of catalyst, initiator compound and alkylene oxide may be brought to any convenient temperature such as from about 20° C., preferably from about 50° C., more preferably from about 70° C., even more preferably from about 80° C. to about 150° C., most preferably to about 130° C. These temperatures are also suitable for conducting the polymerization once the catalyst is activated.

Depending on the desired degree of ethoxylation, all the necessary ethylene oxide may be added to the reactor at the outset. It is usually preferred to add more ethylene oxide to the reactor once the catalyst has become activated, especially when making higher molecular weight polyethers. A convenient way of adding the ethylene oxide is to pressurize the reactor with ethylene oxide and allow ethylene oxide to feed to the reactor on demand, maintaining a more or less constant pressure inside the reactor. Alternatively, any additional ethylene oxide may be fed in one or more discrete increments.

Because ethylene oxide is potentially explosive, an atmosphere of an inert gas such as nitrogen or argon can be charged to the reactor in order to dilute the concentration of ethylene oxide in the vapor space to a level outside the explosive limit. Overall reactor pressures can range from about 20 psig to 150 psig or more, with preferred values being in the range of about 30 to about 90 psig.

Reaction temperatures can also vary widely. The polymerization will proceed at 25° C. or even lower temperatures, and can be conducted at temperatures of up to 150° C. or more. A preferred temperature range is from about 50–130° C. and a more preferred temperature range is from about 70 to about 120° C.

The total amount of ethylene oxide that is fed will depend on the desired equivalent weight of the product. As little as one mole of ethylene oxide per equivalent of initiator compound can be added. This invention is particularly suited for polymerizing at least about 3 moles of ethylene oxide per equivalent of initiator compound. Sufficient ethylene oxide can be added to make any desirable molecular weight polyether, such as one having a weight average molecular weight of 200,000 daltons or more. However, it is desirable for many applications that the product be a liquid. Poly (oxyethylene) homopolymers tend to form solids at room temperature (about 25° C.) when their weight average molecular weights exceed about 700 daltons. Thus, it is of particular interest to add enough ethylene oxide to form a liquid product, and especially to make a product of about 700 weight average molecular weight or below.

The polymerization reaction may be performed continuously or batchwise. In such continuous processes, the activated initiator/catalyst mixture is continuously fed into a continuous reactor such as a continuously stirred tank reactor (CSTR), loop reactor or a tubular reactor. A feed of ethylene oxide is introduced into the reactor and the product continuously removed.

The concentration of the catalyst is selected to polymerize the ethylene oxide at a desired rate or within a desired period of time. Generally, a suitable amount of catalyst is from about 5 to about 10,000 parts by weight metal cyanide catalyst complex per million parts of the product. For determining the amount of catalyst complex to use, the weight of the product is generally considered to equal the combined weight of ethylene oxide and initiator, plus any comonomers that may be used. More preferred catalyst complex levels are from about 10, especially from about 25, to about 5000, more preferably about 3000 ppm, on the same basis.

Once the catalyst is activated, other alkylene oxides may be fed to the reactor and polymerized to form block or random copolymers with the ethylene oxide. For example, a polymer having internal oxyethylene blocks and terminal blocks of, for example, polypropylene oxide) or poly(1,2-butylene oxide) can be made by feeding propylene oxide or 1,2-butylene oxide to the reactor once the catalyst has been activated and the initial charge of ethylene oxide has begun to polymerize. In addition, mixtures of ethylene oxide and another alkylene oxide, such as mixture of ethylene oxide and propylene oxide or a mixture of ethylene oxide and 1,2-butylene oxide, may be fed into the reactor to form a random copolymer that contains internal poly(oxyethylene) blocks. Other alkylene oxides that can be used include styrene oxide or mixtures thereof with ethylene oxide, propylene oxide and/or 1,2-butylene oxide. In addition, monomers that will copolymerize with the alkylene oxide in the presence of the catalyst complex can be used to prepare modified polyether polyols, after the catalyst has become activated. Such comonomers include oxetanes as described in U.S. Pat. Nos. 3,278,457 and 3,404,109 and anhydrides as described in U.S. Pat. Nos. 5,145,883 and 3,538,043, which yield polyethers and polyester or polyetherester polyols, respectively. Lactones as described in U.S. Pat. No. 5,525, 702 and carbon dioxide are examples of other suitable monomers that can be polymerized with the catalyst of the invention.

The initiator compound is a material having at least one oxyalkylatable group. By oxyalkylatable group, it is meant a heteroatom-containing group that can react with ethylene oxide in a ring-opening reaction to form a covalent bond between the heteroatom and a carbon atom of the ethylene oxide. The heteroatom is preferably oxygen or sulfur and is usually attached to a hydrogen atom. Thus, suitable heteroatom-containing groups include hydroxyl, carboxylic acid and thiol groups. Preferred initiator compounds have a molecular weight of about 1000 or less.

Suitable initiator compounds include monoalcohols such methanol, ethanol, n-propanol, isopropanol, n-butanol, isobutanol, t-butanol, 1-t-butoxy-2-propanol, 2-methyl-2-propanol, octanol, octadecanol, hydroxyalkyl acrylates and methacrylates such as 2-hydroxyethyl acrylate, 2-hydroxyethyl methacrylate, 2-hydroxypropylacrylate, 2-hydroxypropylmethacrylate, and the like. Suitable polyalcohol initiators include ethylene glycol, propylene glycol, glycerine, 1,1,1-trimethylol propane, 1,1,1-trimethylol ethane, 1,2,3-trihydroxybutane, pentaerythritol, xylitol, arabitol, mannitol, sucrose, sorbitol, alkyl glucosides such a methyl glucoside and ethyl glucoside and the like. Polyether polyols, particularly polymers of propylene oxide, ethylene oxide and/or 1,2-butylene oxide having an equivalent weight from about 125, preferably to about 150, up to about 1000, preferably up to about 700, more preferably up to about 350, even more preferably up to about 250, are also useful initiator compounds.

Initiator compounds having secondary and/or tertiary hydroxyl groups are of particular interest. It has been found that ethoxylation of secondary and tertiary alcohols can be achieved with metal cyanide catalyst complexes, particularly when the initiator has a molecular weight of about 1000 or less. Thus, an especially preferred aspect of the invention is to ethoxylate a poly(propylene oxide) to introduce primary hydroxyl groups through terminal oxyethylene chains. For many polyurethane applications, these terminal oxyethylene chains typically will constitute from about 10 to about 50, preferably from about 12 to about 22% of the total weight of the product. Other saturated secondary and tertiary initiators include t-butanol, isopropanol, cyclohexyl alcohol and the like. Unsaturated compounds having a secondary or tertiary hydroxyl groups include 3-buten-2-ol and 2-methyl-3-buten-2-ol 2-hydroxypropylacrylate and 2-hydroxypropyl methacrylate, as well as certain of the alkyne and cycloalkyne initiators described in the next paragraph. Such initiators tend to yield alkoxylates having broad polydispersities when reacted using strongly basic catalysts and unacceptable by-products when acid catalysts are employed. Acrylates and methacrylates can also undergo transesterification and/or saponification reactions in the presence of strong bases.

Other initiators of particular interest are those having aliphatic or cycloaliphatic carbon—carbon triple bonds, as unsaturation of this type is usually base sensitive. Initiators of this type include hydroxyl-containing alkynes and cycloalkynes. As a result, alkoxylation of these materials has not been performed successfully using alkali metal hydroxide catalysts due to the great extent of side reactions that occur. Initiator compounds of this type include, for example, 3-butyn-1-ol, propargyl alcohol, 2-methyl-3-butyn-2-ol, 3-butyn-2-ol, 2,5-dimethyl-3-hexyn-2,5-diol, 2,4,7,9-tetramethyl-5-decyne-4,7-diol, 3-methyl-1-pentyn-3-ol, 3,5-dimethyl-1-hexyn-3-ol, ethynylcyclohexanol and the like.

Other initiators of particular interest are those having aliphatic carbon—carbon double bond unsaturation that have one or more allylic protons (i.e., a hydrogen on a —CHR$^6$— group, where R$^6$ is hydrogen or a substituent that does not form all or part of a conjugated structure) bonded directly to one of the carbons bearing the unsaturation. Double bonds of this type are capable of migrating in the presence of base. Initiator compounds of this type include, for example, allyl alcohol, 3-butene-1-ol, cyclohex-2-ene-1-ol and the like.

Yet other initiators of particular interest are saturated compounds that contain a base-sensitive group, such as a halogen, cyano group, ketone, nitro group, ester group and the like. Suitable halogenated alcohols include 2-chloroethanol, 2-bromoethanol, 2-chloro-1-propanol 3-chloro-1-propanol, 3-bromo-1-propanol, 1,3-dichloro-2-propanol 1-chloro-2-methyl-2-propanol.

The metal-containing cyanide catalyst can be represented by the general formula:

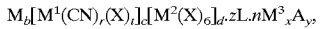

$$M_b[M^1(CN)_r(X)_t]_c[M^2(X)_6]_d \cdot zL \cdot nM^3_xA_y,$$

wherein M is a metal ion that forms an insoluble precipitate with the $M^1(CN)_r(X)_t$ group and which has at least one water soluble salt;

$M^1$ and $M^2$ are transition metal ions that may be the same or different;

each X independently represents a group other than cyanide that coordinates with an $M^1$ or $M^2$ ion;

L represents an organic complexing agent;

$M^3_xA_y$ represents a water-soluble salt of metal ion $M^3$ and anion A, wherein $M^3$ is the same as or different than M;

b and c are positive numbers that, together with d, reflect an electrostatically neutral complex;

d is zero or a positive number;

x and y are numbers that reflect an electrostatically neutral salt;

r is from 4 to 6; t is from 0 to 2;

z is zero or a positive number and n is a positive number indicating the relative quantities of the complexing agent and $M_xA_y$, respectively. z and n may be fractions.

The X groups in any $M^2(X)_6$ do not have to be all the same.

The molar ratio of c:d is advantageously from about 100:0 to about 20:80, more preferably from about 100:0 to about 50:50, and even more preferably from about 100:0 to about 80:20.

Similarly, the catalyst may contain two or more types of $M^1(CN)_r(X)_t$ groups and two or more types of $M^2(X)_6$ groups.

M and $M^3$ are preferably metal ions selected from the group consisting of $Zn^{+2}$, $Fe^{+2}$, $Co^{+2}$, $Ni^{+2}$, $Mo^{+4}$, $Mo^{+6}$, $Al^{+3}$, $V^{+4}$, $V^{+5}$, $Sr^{+2}$, $W^{+4}$, $W^{+6}$, $Mn^{+2}$, $Sn^{+2}$, $Sn^{+4}$, $Pb^{+2}$, $Cu^{+2}$, $La^{+3}$ and $Cr^{+3}$. M and $M^3$ are more preferably $Zn^{+2}$, $Fe^{+2}$, $Co^{+2}$, $Ni^{+2}$, $La^{+3}$ and $Cr^{+3}$. M is most preferably $Zn^{+2}$.

Suitable anions A include halides such as chloride and bromide, nitrate, sulfate, carbonate, cyanide, oxalate, thiocyanate, isocyanate, perchlorate, isothiocyanate, and a $C_{1-4}$ carboxylate. Chloride ion is especially preferred.

$M^1$ and $M^2$ are preferably $Fe^{+3}$, $Fe^{+2}$, $Co^{+3}$, $Co^{+2}$, $Cr^{+2}$, $Cr^{+3}$, $Mn^{+2}$, $Mn^{+3}$, $Ir^{+3}$, $Ni^{+2}$, $Rh^{+3}$, $Ru^{+2}$, $V^{+4}$ and $V^{+5}$. Among the foregoing, those in the plus-three oxidation state are more preferred. $Co^{+3}$ and $Fe^{+3}$ are even more preferred and $Co^{+3}$ is most preferred.

Preferred groups X include anions such as halide (especially chloride), hydroxide, sulfate, $C_{1-4}$ carbonate, oxalate, thiocyanate, isocyanate, isothiocyanate, $C_{1-4}$ carboxylate and nitrite ($NO_2$—), and uncharged species such as CO, $H_2O$ and NO. Particularly preferred groups X are NO, $NO_2$— and CO.

The catalyst is usually complexed with an organic complexing agent. A great number of complexing agents are potentially useful although catalyst activity may vary according to the selection of a particular complexing agent. Examples of such complexing agents include alcohols, aldehydes, ketones, ethers, amides, nitriles, sulfides, and the like.

Suitable alcohols include monoalcohols and polyalcohols. Suitable monoalcohols include methanol, ethanol, n-propanol, isopropanol, n-butanol, isobutanol, t-butanol, octanol, octadecanol, 3-butyn-1-ol, 3-butene-1-ol, propargyl alcohol, 2-methyl-2-propanol, 2-methyl-3-butyn-2-ol, 2-methyl-3-butene-2-ol, 3-butyn-1-ol, 3-butene-1-ol, 1-t-butoxy-2-propanol and the like. Suitable monoalcohols also include halogenated alcohols such as 2-chloroethanol, 2-bromoethanol, 2-chloro-1-propanol, 3-chloro-1-propanol, 3-bromo-1-propanol, 1,3-dichloro-2-propanol, 1-chloro-2-methyl-2-propanol as well as nitroalcohols, keto-alcohols, ester-alcohols, cyanoalcohols, and other inertly substituted alcohols.

Suitable polyalcohols include ethylene glycol, propylene glycol, glycerine, 1,1,1-trimethylol propane, 1,1,1-trimethylol ethane, 1,2,3-trihydroxybutane, pentaerythritol, xylitol, arabitol, mannitol, 2,5-dimethyl-3-hexyn-2,5-diol, 2,4,7,9-tetramethyl-5-decyne-4,7-diol, sucrose, sorbitol, alkyl glucosides such as methyl glucoside and ethyl glucoside, and the like. Low molecular weight polyether polyols, particular those having an equivalent weight of about 350 or less, more preferably about 125–250, are also useful complexing agents.

Suitable aldehydes include formaldehyde, acetaldehyde, butyraldehyde, valeric aldehyde, glyoxal, benzaldehyde, toluic aldehyde and the like. Suitable ketones include acetone, methyl ethyl ketone, 3-pentanone, 2-hexanone and the like.

Suitable ethers include cyclic ethers such as dioxane, trioxymethylene and paraformaldehyde as well as acyclic ethers such as diethyl ether, 1-ethoxy pentane, bis(betachloro ethyl) ether, methyl propyl ether, diethoxy methane, dialkyl ethers of alkylene or polyalkylene glycols (such as ethylene glycol dimethyl ether, diethylene glycol dimethyl ether, triethylene glycol dimethyl ether and octa-ethylene glycol dimethyl ether), and the like.

Amides such as formamide, acetamide, propionamide, butyramide and valeramide are useful complexing agents. Esters such as amyl formate, ethyl formate, hexyl formate, propyl formate, ethyl acetate, methyl acetate, triethylene glycol diacetate and the like can be used as well. Suitable nitriles include acetonitrile, proprionitrile and the like. Suitable sulfides include dimethyl sulfide, diethyl sulfide, dibutyl sulfide, diamyl sulfide and the like.

Preferred complexing agents are t-butanol, 1-t-butoxy-2-propanol, polyether polyols having an equivalent weight of about 75–350 and dialkyl ethers of alkylene and polyalkylene glycols. Especially preferred complexing agents are t-butanol, 1-t-butoxy-2-propanol, polyether polyols having an equivalent weight of 125–250 and a dimethyl ether of mono-, di- or triethylene glycol. t-Butanol and glyme (1,2-dimethoxy ethane) are especially preferred.

A silane-functional complexing agent, as described in the application of Wehmeyer, application Ser. No. 09/574,842, entitled Method for Preparing Metal Cyanide Catalysts Using Silane-Functional Ligands, filed May 19, 2000, now U.S. Pat. No. 6,348,565, issued Feb. 19, 2002, may be used instead of or in addition to the aforementioned complexing agents. As described therein, the silane-functional complexing agent may be polymerized to form a film or polymer, optionally on a support, or may function as a coupling agent to attach the catalyst complex to a support material.

In addition, the catalyst complex often contains a quantity of water that is bound into the crystalline lattice of the complex. Although the amount of bound water is difficult to determine, it is believed that this amount is typically from about 0.25 to about 3 moles of water per mole of $M^1$ and $M^2$ ions.

Exemplary catalysts include:
Zinc hexacyanocobaltate.$zL.nZnCl_2$;
$Zn[Co(CN)_5NO].zL.nZnCl_2$;
$Zn_s[Co(CN)_6]_o[Fe(CN)_5NO]_p.zL.nZnCl_2$ (o, p=positive numbers, s=1.5o+p);
$Zn_s[Co(CN)_6]_o[Co(NO_2)_6]_p[Fe(CN)_5NO]_q.zL.nZnCl_2$ (o, p, q=positive numbers, s=1.5(o+p)+q);
Zinc hexacyanocobaltate.$zL.nLaCl_3$;
$Zn[Co(CN)_5NO].zL.nLaCl_3$;
$Zn[Co(CN)_6]_o[Fe(CN)_5NO]_p.zL.nLaCl_3$ (o, p=positive numbers, s=1.5o+p);
$Zn_s[Co(CN)_6]_o[Co(NO_2)_6]_p[Fe(CN)_5NO]_q.zL.nLaCl_3$ (o, p, q=positive numbers, s=1.5(o+p)+q);
Zinc hexacyanocobaltate.$zL.nCrCl_3$;
$Zn[CO(CN)_5N].zL.nCrCl_3$;
$Zn_s[Co(CN)_6]_o[Fe(CN)_5NO]_p.zL.nCrCl_3$ (o, p=positive numbers, s=1.5o+p);
$Zn_s[Co(CN)_6]_o[Co(NO_2)_6]_p[Fe(CN)_5NO]_q.zL.nCrCl_3$ (o, p, q=positive numbers, s=1.5(o+p)+q);
Magnesium hexacyanocobaltate.$zL.nZnCl_2$;
$Mg[Co(CN)_5NO].zL.nZnCl_2$;
$Mg_s[Co(CN)_6]_o[Fe(CN)_5NO]_p.zL.nZnCl_2$ (o, p=positive numbers,s=1.5o+p);
$Mg_s[Co(CN)_6]_o[Co(NO_2)_6]_p[Fe(CN)_5NO]_q.zL.nZnCl_2$ (o, p, q=positive numbers, s=1.5(o+p)+q);
Magnesium hexacyanocobaltate.$zL.nLaCl_3$;
$Mg[Co(CN)_5NO].zL.nLaCl_3$;
$Mg_s[Co(CN)_6]_o[Fe(CN)_5NO]_p.zL.nLaCl_3$ (o, p=positive numbers, s=1.5o+p);
$Mg_s[Co(CN)_6]_o[Co(NO_2)_6]_p[Fe(CN)_5NO]_q.zL.nLaCl_3$ (o, p, q=positive numbers, s=1.5(o+p)+q);
Magnesium hexacyanocobaltate.$zL.nCrCl_3$;
$Mg[Co(CN)_5NO].zL.nCrCl_3$;
$Mg_s[Co(CN)_6]_o[Fe(CN)_5NO]_p.zL.nCrCl_3$ (o, p=positive numbers, s=1.5o+p);
$Mg_s[Co(CN)_6]_o[Co(NO_2)_6]_p[Fe(CN)_5NO]_q.zL.nCrCl_3$ (o, p, q=positive numbers, s=1.5(o+p)+q);
Calcium zinc hexacyanocobaltate;

as well as the various complexes such as are described at column 3 of U.S. Pat. No. 3,404,109, incorporated herein by reference. Catalyst slurries in initiator compounds, such as are described in copending provisional application No. 60/365,666, filed Mar. 19, 2002 (incorporated herein by reference), can also be used.

The catalyst complex may be supported. One method of making a supported catalyst is by precipitating the catalyst in the presence of a polycarboxyl or polycarboxylate compound, as described in copending application of Wehmeyer, application Ser. No. 09/574,848, entitled Method for Preparing Metal Cyanide Catalysts using Polycarboxylic Acids, filed May 19, 2000 (and its counterpart WO 01/04180 published Jan. 18, 2001). Supported catalysts as described in WO 99/44379 are also useful. In addition, supported catalysts can be prepared as described in the copending application of Wehmeyer, application Ser. No. 09/574,843, entitled Metal Cyanide Catalysts on Inorganic Supports, filed May 19, 2000, now abandoned, and in its counterpart WO 01/04177 published Jan. 18, 2001.

The catalyst complex is conveniently made using standard precipitation methods as are described, for example, in U.S. Pat. Nos. 3,278,457, 3,278,458, 3,278,459, 3,404,109, 3,427,256, 3,427,334, 3,427,335, 5,470,813, 5,482,908, 5,536,883, 5,589,431, 5,627,120, 5,627,122, 5,639,705, 5,714,428, 5,731,407, 5,780,584, 5,783,513, all incorporated herein by reference. In addition, the catalyst may be formed directly as a dispersion in an initiator compound, as described in copending application of Wehmeyer, application Ser. No. 09/574,847, entitled Method for Preparing Metal Cyanide Catalyst/Polyol Initiator Slurries, filed May 19, 2000, or and in its counterpart, WO 01/90216, published Nov. 29, 2001, through an incipient wetness technique as described in the copending application of Molzahn et al, application Ser. No. 09/574,844, entitled Incipient Wetness Method for Making Metal-Containing Cyanide Catalysts, filed May 19, 2000 and in its counterpart, WO 01/03831, published Jan. 18, 2001.

The product polyether contains one or more chains of oxyalkylene groups that are bonded to the initiator compound through a heteroatom. The heteroatom is preferably oxygen and is most preferably an ether linkage. The equivalent weight of the product polyether may be up to 200,000 daltons or more. Poly(ethylene oxide) homopolymers tend to be solids at molecular weights of 700 or more. Thus, for applications where a liquid polyether is desired, a poly (ethylene oxide) homopolymer made in accordance with this invention desirably has a molecular weight of less than about 700. For many common initiators, this corresponds to a degree of ethoxylation of about 3 to about 16 moles of ethylene oxide per mole of initiator.

The product polyether is typically prepared in good yield with only small amounts of undesired by-products. In some instances, the product may contain a high molecular weight fraction that has a weight average molecular weight of 2× or more of that of the desired product. Typically, when this fraction is present, it constitutes about 20% or less, more typically less than about 10% of the total weight of the product.

Other than the high molecular weight fraction, the process of the invention permits the ethoxylation of a wide range of initiator compounds with the formation of few by-products. By-products other than unreacted starting materials and the high molecular weight fraction typically constitute less than about 10% by weight of the product, more typically less than about 5 weight percent and even more typically less than about 2 weight percent.

In particular, this process is suitable for ethoxylating initiators having functional groups such as carbon—carbon triple bond unsaturation which are sensitive to alkali metal or alkaline earth bases, to the extent of three or more moles of ethylene oxide per equivalent of initiator, to form a product containing no more than about 10 weight percent, preferably less than about 5 weight percent and even preferably less than about 2 weight percent of by-products, other than unreacted starting materials and the high molecular weight fraction, based on the total weight of the product prior to any clean up or purification.

Similarly, this process is particularly suitable for preparing an ethoxylated product with low polydispersity from an initiator containing a carbon—carbon double bond (ethylenic initiator), in which the product contains on average at least three added oxyethylene group/equivalent of initiator.

In addition, this process is particularly suitable for preparing an ethoxylated product with low polydispersity from an initiator containing a halogen (especially chlorine, bromine and iodine), cyano group, ketone, nitro group or ester group, in which the product contains on average at least three added oxyethylene group/equivalent of initiator. Initiators of this type may contain carbon—carbon aliphatic unsaturation, or may be devoid of such unsaturation.

Furthermore, this process is particularly suitable for preparing an ethoxylated product with low polydispersity from a tertiary alcohol initiator.

The product polyether is generally characterized by having a good polydispersity, typically less than about 2.0, more typically less than about 1.6, and preferably less than about 1.2. These polydispersities can be obtained even when the initiator contains tertiary oxyalkalatable groups.

In a preferred embodiment, the poly(ethylene oxide) polyol produced in accordance with the invention may be used as an intermediate which is subsequently reacted with other alkylene oxides to form block or random copolymers. This subsequent reaction with other alkylene oxides may be performed immediately after the oxyethylation is performed, or at some later time. Unless the DMC catalyst is deactivated in some way, the catalyst normally remains active in the polyether. Thus, the pol(ethylene oxide) polyol obtained is in the form of an active intermediate that may be stored or transported for use as an initiator in a subsequent reaction with another alkylene oxide.

The activated intermediate can be used immediately as a catalytic starting material for making higher molecular weight polyethers. However, because it can retain its catalytic activity for indefinite periods, the activated intermediate can be stored for an indefinite period before use. If desired, it can be transported to a remote location where it can be used.

The ability to transport the activated intermediate offers several significant benefits. Many locations where polyether polyols are made do not have a local source of ethylene oxide. Thus, any ethylene oxide that is used in those locations must be transported to the production site. Transporting ethylene oxide can be quite hazardous, because ethylene oxide is explosive and is transported under high pressures. In some locations, the equipment and infrastructure needed to transport ethylene oxide safely does not exist, or is prohibitively expensive. By forming an activated intermediate according to the invention, ethylene oxide is, in effect, converted to a liquid form that is no longer explosive. Thus, shipping the activated intermediate is tantamount to shipping an equivalent amount of ethylene oxide values, in a less hazardous manner.

No special treatment or procedures are needed to maintain the intermediate in active form. It is only necessary not to expose the intermediate to reagents or oxidants that can inactivate the catalyst. This is conveniently accomplished by maintaining the intermediate under an inert atmosphere such as nitrogen or argon, and to avoid exposure to extremes of temperature. The intermediate can maintain catalytic activity of periods of several months or more.

To use the intermediate in making a higher molecular weight polymer, it is contacted under polymerization conditions with an additional quantity of an alkylene oxide and optionally one or more comonomers. The relative quantities of intermediate and additional monomers are selected so that the product has the intended molecular and/or equivalent weight, and enough catalyst is present to provide a commercially acceptable polymerization rate. The molecular weight of the product may vary from 300 to 100,000 or more, depending on the intended application; thus the proportions of intermediate and monomers can vary quite substantially. Generally, enough of the intermediate is used to provide from about 10 to about 5,000 ppm, preferably from about 10 to about 500 ppm, more preferably from about 20 to about 250 ppm of metal cyanide catalyst, based on the weight of the product.

It is also possible to deactivate the catalyst or remove it from the intermediate, transport the intermediate, and then add more DMC catalyst, activate the catalyst in the presence of an alkylene oxide (other than ethylene oxide, or a mixture including ethylene oxide) and optionally one or more comonomers, and then polymerize the alkylene oxide to form the block copolymer.

The following examples are provided to illustrate the invention, but are not intended to limit its scope. All parts and percentages are by weight unless otherwise indicated.

EXAMPLE 1

A. Preparation of Metal Cyanide Catalyst

Deionized water (128.9 g) and 106.7 g anhydrous $CaCl_2$ are mixed and heated to 65° C. with stirring. Calcium oxide (0.2 g) is added and the resulting mixture heated to 50–70° C. for 80 minutes. The mixture is cooled to 31° C., 155 g deionized water and 9.87 g potassium hexacyanocobaltate are added, and the mixture is stirred thoroughly. The mixture is then added slowly to a 50° C. solution of 6.174 g zinc chloride in 153.5 g deionized water, and a precipitate forms. The resulting slurry is heated at 50° C. and stirred for about 30 minutes after the mixing is completed.

A solution of 10.5 g of a 1000 molecular weight poly(propylene oxide) diol, 2.7 g of t-butanol and 42 g distilled water is added to the slurry and mixed in. The slurry is filtered under pressure and the recovered solids left overnight. The solids are then reslurried in a mixture of 67 g t-butanol and 37 g deionized water, heated to 50° C. for about 2 hours, mixed with an additional 1.4 g of the poly(propylene oxide) diol, stirred for 10 minutes and pressure filtered.

B. Ethoxylation of Glycerine

Glycerine (60 g) and 0.1 g of the catalyst from part A are heated to 110° C. with 45 ml of ethylene oxide in a closed reactor to generate an internal reactor pressure of 70 psig. The mixture is maintained at 110° C. for ten hours, after which all of the ethylene oxide has polymerized. An additional 45 ml of ethylene oxide is added and the temperature raised to 120° C. This second portion of ethylene oxide polymerizes in about 160 minutes. A third portion of 47 ml ethylene oxide is added to the reactor, and is polymerized within 263 minutes. The product is clear and slightly yellow. There is no visible evidence of any very high molecular weight poly(ethylene oxide). By GPC, the product has an $M_n$ of 350, an $M_w$ of 370 and a polydispersity of 1.06.

EXAMPLE 2

A. Preparation of Metal Cyanide Catalyst Complex

Zinc chloride (7.378 g) is dissolved in enough water to form 155.66 g of solution, and a small amount of 1M HCl is added until the solution is clear and colorless. Separately, potassium hexacyancobaltate (12.032 g) is dissolved in water to make 235.08 g of solution. The latter solution is added to the zinc chloride solution at the rate of 2 ml/min. A solid precipitates, and is recovered by centrifuging. It is washed five times with deionized water and centrifuged each time. After the washing, the solid is vacuum dried. A portion of the solid (1.012g) is impregnated with about 2.173 g of a solution made from 0.292 g zinc chloride, 1.132 g glyme and 1.132 water. The impregnated material is allowed to dry for 4 hours at ambient conditions and further dried for 2 hours in a vacuum oven.

B. Ethoxylation of Poly(Propylene Oxide) Triol

An autoclave is charged with 0.1328 parts of the catalyst complex from part A and 69.47 grams of a 700 molecular weight poly(propylene oxide) triol (VORANOL® 2070, available from The Dow Chemical Company). The reactor is purged with nitrogen, heated to 90° C., purged again with nitrogen and pressurized to 24.35 psia with nitrogen. Ethylene oxide is pumped in until the pressure is doubled. After polymerization begins, ethylene oxide is fed at the rate of about 0.5 ml/min, until 30 ml ethylene oxide has been added. The entire amount of ethylene oxide reacts within 10 hours. The product contains 23.6% primary hydroxyl groups, indicating that partial ethoxylation has occurred.

EXAMPLE 3

An autoclave is charged with 0.1328 parts of the catalyst complex from Example 2A and 32.8 grams of a 700 molecular weight poly(propylene oxide) triol (VORANOL® 2070, available from The Dow Chemical Company). The reactor is heated to 100° C. and 15 ml of propylene oxide is fed in. The propylene reacts, as indicated by a drop in pressure in the reactor. The mixture is heated at 100° C. for a period after the pressure drops to a constant value in order to complete the reaction of the propylene oxide. The product is then mixed with an additional 30 grams of the poly(propylene oxide) triol, the reactor is purged with nitrogen, heated to 100° C., purged again with nitrogen and pressurized to 32.35 psia with nitrogen. Ethylene oxide is pumped in until the pressure is doubled. A short induction period is seen before polymerization begins. After polymerization begins, ethylene oxide is fed at the rate of about 0.5 ml/min until 30 ml ethylene oxide has been added. The entire amount of ethylene oxide reacts within 2.6 hours. The product contains 35% primary hydroxyl groups, indicating that partial ethoxylation has occurred.

EXAMPLE 4

An autoclave is charged with 0.1329 parts of the catalyst complex from Example 2A and 70.06 grams of a 700 molecular weight poly(propylene oxide) triol (VORANOL® 2070, available from The Dow Chemical Company). The reactor is purged with nitrogen, heated to 130° C., purged again with nitrogen and pressurized to 42.35 psia with nitrogen. Ethylene oxide is pumped in until the pressure is doubled. After polymerization begins, ethylene oxide is fed at the rate of about 0.5 m/min, until 30 ml ethylene oxide has been added. The entire amount of ethylene oxide reacts within 1.3 hours. The product contains 41.9% primary hydroxyl groups, indicating that partial ethoxylation has occurred.

EXAMPLE 5

A zinc hexacyanocobaltate/t-butanol/450 MW poly(propylene oxide) triol catalyst complex (6.8 g) and 229.86 g of 2-methyl-3-butyn-2-ol are charged to a 2 gallon reactor, taking care to transfer all of the catalyst complex into the reactor. The reactor is sealed and degassed/purged several times with nitrogen, with the pressure being maintained above atmospheric pressure at all times to prevent loss of initiator. The mixture is stirred and heated to 90° C. A portion of ethylene oxide (50 g) is added. The mixture is heated and stirred. A small pressure drop is observed after about 20 minutes. Thirty minutes after the initial addition of ethylene oxide, an additional 50 g of EO is added. Another 950 g of ethylene oxide are then fed upon demand. As the reaction progresses, a vigorous exotherm develops. The EO feeds out rapidly and is digested quickly. The product is a pale yellow liquid that becomes opaque but remains liquid as it cools to room temperature. The $M_n$ of the product is 560, and the polydispersity is 1.63. NMR analysis shows that the ethylene oxide has added onto the initiator.

EXAMPLE 6

2-methyl-3-butyn-2-ol (233.84 g), 4.26 g of the catalyst complex described in Example 5 and 950 grams of ethylene oxide are polymerized in the same manner as described in Example 5, except that the initial charge of ethylene oxide weighs about 75–100 g. The reaction proceeds more slowly than that of Example 5. A brown product of 370 $M_n$ and 2.03 polydispersity is obtained. NMR analysis clearly shows that the 2-methyl-3-butyn-2-ol has initiated the polymerization.

EXAMPLE 7

A zinc hexacyanocobaltate/t-butanol/450 MW poly(propylene oxide) triol catalyst complex (6.0 g) and 271.87 g of 2-methyl-3-butyn-2-ol are charged to a 2 gallon reactor, taking care to transfer all of the catalyst complex into the reactor. The reactor is sealed and degassed/purged several times with nitrogen, with the pressure being maintained above atmospheric pressure at all times to prevent loss of initiator. The mixture is stirred and heated to 90° C. A portion of ethylene oxide (135 g) is added. After thirty minutes, an additional 50 g of ethylene oxide is. After another 90 minutes, another 50 g of ethylene oxide is added. About two hours after that, an ethylene oxide feed to the reactor is begun, starting at 1 g/min and gradually increasing to 4 g/min and then decreasing to 3.5 g/min, until a total of 1105 g ethylene oxide has been added. The yield is 1260 g of a very light colored liquid which became opaque (white) upon standing overnight but remained fluid. GPC analysis shows the product to have a $M_n$ of 380, with a main fraction at $M_n$ 360 (polydispersity of 1.31) and a small fraction at $M_n$ 1560 (polydispersity of 1.03). Overall polydispersity is 1.37. $C^{13}$ NMR analysis showed that some starting material remains in the product.

EXAMPLE 8

A zinc hexacyanocobaltate/t-butanol/450 MW poly(propylene oxide) triol catalyst complex (0.53 g) and 235.05 g of 2-methyl-3-buten-2-ol are homogenized and charged under nitrogen to a 2 gallon reactor, taking care to transfer all of the catalyst complex into the reactor. The reactor is sealed and degassed/purged several times with nitrogen, with the pressure being maintained above atmospheric pressure at all times to prevent loss of initiator. The mixture is stirred and heated to 90° C. A portion of ethylene oxide (about 50–150 g) is added. When the pressure in the reactor drops, indicating the start of polymerization, a feed of ethylene oxide is begun. The feed rate is varied until a constant reactor pressure is obtained. A total of 2165 g of ethylene oxide is added. As the reaction progresses, a vigorous exotherm develops. The product has a $M_n$ of 940 and a polydispersity of approximately 1.1.

EXAMPLE 9
A. Preparation of Supported Metal Cyanide Catalyst

A mixture of 600 mL water and 5 g (about 0.0454 eq. —COO—) of small (99% <1000 microns) lightly crosslinked poly(acrylic acid) potassium salt beads (Aldrich catalog #43,532-5) is prepared. The beads swell when added to the water. To the mixture is added a solution of 4.0 g (0.036 eq.) $K_3Co(CN)_6$ in 100 mL of water. This causes the swollen beads to shrink somewhat.

With mixing, a solution of 19.35 g (0.284 eq.) zinc chloride in 50 mL water is added to the bead mixture over about 1 minute. A white precipitate forms immediately. As soon as the zinc chloride addition is complete, 100 mL t-butanol is added. The resulting mixture is stirred for 10 minutes, then filtered through Whatman® #4 filter paper. The filtrate is clear and colorless. The collected solids are reslurried in a solution of 6.45 g (0.094 eq.) zinc chloride in 140 mL t-butanol and 60 mL water, stirred for 10 minutes and filtered again. The filtrate is again clear and colorless.

The solids are again reslurried in 200 mL t-butanol, stirred for 10 minutes and filtered as before. A white, powdery filtrate is obtained, which is dried overnight in a vacuum over (30 mm Hg, 50° C.). The mass of the dried catalyst complex is 8.85 g.

B. Ethoxylation of 2-methyl-3-butyn-2-ol 2-methyl-3-butyn-2-ol (259.24 g) is ethoxylated with 1050 g ethylene oxide according the general method described in Example 8, using 16.55 g of the supported catalyst from part A. The product has a polydispersity of 1.66 and an $M_n$ of 380. $C^{13}$ NMR confirms that the initiator compound has been consumed in the reaction.

EXAMPLE 10
A. Preparation of Supported Metal Cyanide Catalyst 89.65 g of a 3.66 wt % solution of $H_3Co(CN)_6$ in methanol (15.05 mmol $H_3Co(CN)_6$) is added over 15 minutes to a stirred mixture of $ZnCl_2$ (6.15 g, 45.2 mmol), 25.0 g of an 8000 molecular weight bis(dimethoxymethylsilyl)-terminated poly(propylene oxide) (Aldrich catalog #45,041-3) and 15 g tetraethyl orthosilicate (15.0 g) in 150 mL methanol. A slurry forms immediately. After stirring the slurry for 15 minutes, water (5.2 g) is added and the mixture stirred for 5 minutes. The final mass of the resultant slurry is approximately 253.3 g. The mixture consists of a very finely divided translucent white suspension of catalyst in methanol.

The slurry is then added in small batches over about 110 minutes to 150 g silica gel (60–200 mesh particles, 150A pore size, Aldrich catalog #24,3998-1) while the flask is occasionally swirled and shaken to allow the silica to be uniformly wetted. The silica is stripped on a rotoevaporator at 70–75° C. bath temp and 25 inches Hg vacuum once during the coating process, after approximately two-thirds of the total slurry is added. After the slurry is added the silica is further dried on the rotoevaporator at 70–75° C. bath temp and 25 inches Hg vacuum, then finally at 70–75° C. bath temp (>30 inches Hg vacuum) for approximately 10–15 min.

The product is further dried in a vacuum oven at full pump vacuum (90–95° C./>30 in Hg vacuum) for 14 hours. The resultant product weighs 181.42 g and contains approximately 4.2% catalyst (as $Zn_3[Co(CN)_6]_2 \cdot nZnCl_2$, ignoring any associated water and complexing agent).

B. Ethoxylation of 2-methyl-3-butyn-2-ol 2-methyl-3-butyn-2-ol (257.61 g) is ethoxylated with 1005 g ethylene oxide according the general method described in Example 8, using 89.89 g of the supported catalyst from part A. The product has a polydispersity of about 1.4. $C^{13}$ NMR confirms that the initiator compound has been consumed in the reaction.

EXAMPLE 11

Allyl alcohol (284.37 g) is ethoxylated with 1615 g ethylene oxide in the presence of 2.86 g of zinc hexacyanocobaltate/t-butanol/450 MW poly(propylene oxide) triol catalyst complex, according the general method described in Example 8. $C^{13}$ NMR confirms that the ethoxylate of allyl alcohol has been formed. The $M_n$ of the primary product is 380. The high molecular weight fraction constitutes 3.4 wt % of the total product and has an $M_n$ of 3300. Polydispersity is 1.06 by GPC.

EXAMPLE 12

A 700 molecular weight polypropylene oxide) triol (VORANOL® 2070, available from The Dow Chemical Company) (689.9 g) is ethoxylated with 910 g ethylene oxide in the presence of 2.62 g of zinc hexacyanocobaltate/t-butanol/450 MW polypropylene oxide) triol catalyst complex, according the general method described in Example 8. The product has a $M_n$ of 2090 and a polydispersity of 1.07. It contains 44.8 wt. % polymerized propylene oxide (from the triol initiator), 48.9 wt. % ethylene oxide and 6.2 wt. % residue from glycerine (from the triol initiator). The product contains 2.6 mol-% diol and 97.4 mole-% triol. 80% of the hydroxyl groups are primary hydroxyl.

EXAMPLE 13

A zinc hexacyanocobaltate/t-butanol/450 MW poly (propylene oxide) triol catalyst complex (5.94 g) and 58.84 g of 1,3-dichloro-2-propanol are homogenized and charged to a 2 gallon reactor, taking care to transfer all of the catalyst complex into the reactor. The reactor is sealed and degassed/purged several times with nitrogen, with the pressure being maintained above atmospheric pressure at all times to prevent loss of initiator. The mixture is stirred and heated to 90° C. A portion of ethylene oxide (85 g) is added. The mixture is heated and stirred. A small pressure drop is observed after about 20 minutes. Two hours after the initial addition of ethylene oxide, an additional 65 g of ethylene oxide is added. Another 515 g of ethylene oxide are then fed upon demand. The product is a yellow liquid that becomes opaque but remains liquid as it cools to room temperature. The $M_n$ of the product is 310, and the polydispersity is 1.16. NMR analysis shows that the ethylene oxide has added onto the initiator.

EXAMPLE 14

The ability of several catalysts to ethoxylate various initiator compounds is evaluated by placing a quantity of the initiator, a catalyst and ethylene oxide into a dried Wheaton vial fitted with a stir bar. The vial is sealed with a septum cap and purged with nitrogen. About 0.5 g of ethylene oxide are added by syringe and the septum cap is replaced with a solid cap under nitrogen. The vial is heated at 90° C. for 14 hours. Table 1 identifies certain other reaction parameters, as well as characteristics of the resulting polymer.

In all cases, $C^{13}$ NMR confirms that the initiator compound is consumed in the alkoxylation reaction.

The initiators are:
A. 3-butyn-1-ol
B. isopropanol
C. t-butanol
D. 1,3-dichloro-2-propanol
E. 2-chloroethanol
F. 2-hydroxyethyl acrylate
G. 3,5-dimethyl-1-hexyn-3-ol
H. 3-methyl-1-pentyn-3-ol
I. 2-methyl-3-butyn-2-ol
J. 2-methyl-3-buten-2-ol
K. 226 molecular weight poly(propylene oxide) triol
L. 450 molecular weight poly(propylene oxide) triol
M. 2-methyl-2-nitro-1-propanol
N. 3'-hydroxyacetophenone
O. acetol
P. 2-hydroxyethyl methacrylate
Q. glycolic acid
R. ethyl 3-hydroxybutyrate
S. ethyl glycolate
T. pantolactone The catalysts are:
A. Zinc hexacyanocobaltate complexed with t-butanol and treated with a 450 molecular weight poly(propylene oxide) triol
B. Zinc hexacyanocobaltate complexed with glyme.
C. Zinc hexacyanocobaltate supported on a lightly crosslinked poly(acrylic acid) polymer, made as in Example 9A.
D. A supported catalyst made as follows: A mixture of 50 mL water and 5 g of a 45% solution of poly(acrylic acid) sodium salt in water (Aldrich catalog #41,601-0, about 0.053 mol $Na^+$) is prepared. To the mixture is added a solution of 4.0 g (0.036 eq.) $K_3Co(CN)_6$ in 70 mL of water. With mixing, a solution of 19.35 g (0.142 mol) zinc chloride in 40 mL water is added over about 1 minute. A white precipitate forms immediately. A mixture of 50 mL t-butanol and 50 mL water is added, and the mixture is stirred for 10 minutes and filtered through Whatman® #4 filter paper. The collected solids are reslurried in a solution of 6.45 g zinc chloride in 140 mL t-butanol and 60 mL water, stirred for 10 minutes and filtered again. The collected solids are then reslurried in 200 mL t-butanol, stirred as before and filtered again. A white filtrate is obtained, which is dried overnight in a vacuum oven (30 mm Hg, 50° C.).
E. A supported catalyst made as follows: A solution of potassium hydroxide in water (0.053 moles KOH in 50 mL water is added to solid 1,3,5-benzene tricarboxylic acid (BTA) (3.71 g, 0.177 mmol), and diluted to a volume of 300 mL with additional water. An additional 0.26 g of solid 85% KOH and a small quantity of potassium bicarbonate are added to form a clear, colorless solution. Solid $K_3Co(CN)_6$ (4.0 g, 0.012 mol) is added with stirring. Then, a solution of 19.35 g (0.142 mol) zinc chloride in 40 mL of water is added with continued stirring. A white flocculent forms as the zinc chloride solution is added. A solution of 50 mL water and 50 mL of t-butanol is immediately added. The mixture is stirred for 10 minutes and filtered through Whatman® #41 filter paper. The filtered solid is reslurried in a solution of zinc chloride (6.45 g, 0.047 mol) in 140 mL t-butanol and 60 mL water, stirred 10 minutes and filtered again. The filtered solids are then reslurried in 200 mL t-butanol, stirred 10 minutes, filtered and dried in a vacuum oven overnight at 50° C. The mass of the final product is 10.16 g.
F. A supported catalyst made as follows: 30.72 g of the $H_3Co(CN)_6$ solution (6.02 mmol $H_3Co(CN)_6$) is stirred into a mixture of zinc chloride (2.461 g, 18.1 mmol), 8 g of an 8000 molecular weight bis(dimethoxymethylsilyl)-terminated poly(propylene oxide) (Aldrich catalogue #45, 041-3), tetraethyl orthosilicate (1.0 g, 4.8 mmol), and 30 mL of methanol. A slurry forms, which is stirred for about 10 minutes before 0.36 g of water is added. The slurry is then stirred for an additional 5–10 minutes prior to addition to the various supports. The resultant methanolic slurry contains approximately 4.53 wt % of metal cyanide catalyst. Part (22.9 g) of the slurry is added in one portion to 10 g (undried weight) of Grade 62, 60–200 mesh silica gel particles. The solvent is then removed using a rotoevaporator, initially at 70–75° C./25 inches Hg vacuum, followed by a few minutes at 30 inches Hg vacuum on the rotoevaporator. The product is further dried overnight in a vacuum oven at 50° C./<30 inches Hg vacuum. The product is estimated to contain 7.7 wt. % metal cyanide catalyst (as $Zn_3[Co(CN)_6]_2 \cdot nZnCl_2$, ignoring any associated water and complexing agent).
G. A supported catalyst made as follows: 30.72 g of a $H_3Co(CN)_6$ solution (6.02 mmol $H_3Co(CN)_6$) is stirred into a mixture of zinc chloride (2.461 g, 18.1 mmol), 8 g of an 8000 molecular weight bis(dimethoxymethylsilyl)-terminated poly(propylene oxide) (Aldrich catalogue #45, 041-3), tetraethyl orthosilicate (1.0 g, 4.8 mmol), and 30 mL of methanol. A slurry forms, which is stirred for about 10 minutes before 0.36 g of water is added. The slurry is then stirred for an additional 5–10 minutes prior to addition to the various supports. The resultant methanolic slurry contains approximately 4.53 wt % of metal cyanide catalyst. 20.0 g of the resulting slurry is added in batches to 25 g (undried weight, including about 13% water) of 6–16 mesh, irregularly shaped silica gel chips, with periodic removal of solvent during the additions using a rotoevaporator. After the addition of the slurry is complete, the product is further stripped on the rotoevaporator at 70–75° C./25 inches Hg vacuum. This is followed by a few minutes at 30 inches Hg vacuum on the rotoevaporator. The product is further dried overnight in a vacuum oven at 50° C./<30 inches Hg vacuum. The product is estimated to contain 3.5 wt. % metal cyanide catalyst.

H. A supported catalyst made as follows: 30.72 g of a $H_3CO(CN)_6$ solution (6.02 mmol $H_3Co(CN)_6$) is stirred into a mixture of zinc chloride (2.461 g, 18.1 mmol), 8 g of an 8000 molecular weight bis(dimethoxymethylsilyl)-terminated polypropylene oxide) (Aldrich catalogue #45,041-3), tetraethyl orthosilicate (1.0 g, 4.8 mmol), and 30 mL of methanol. A slurry forms, which is stirred for about 10 minutes before 0.36 g of water is added. The slurry is then stirred for an additional 5–10 minutes prior to addition to the various supports. The resultant methanolic slurry contains approximately 4.53 wt % of metal cyanide catalyst. 20.0 g of the slurry is added in batches to 25 g porous 7/32" diameter alumina spheres, with periodic removal of solvent during the additions using a rotoevaporator. After the addition of the slurry is complete, the product is further stripped on the rotoevaporator at 70–75° C./25 inches Hg vacuum. This is followed by a few minutes at 30 inches Hg vacuum on the rotoevaporator. The product is further dried overnight in a vacuum oven at 50° C./<30 inches Hg vacuum. The product is estimated to contain 3.3 wt. % metal cyanide catalyst.

I. A supported catalyst made as follows: About 15.36 g of a $H_3CO(CN)_6$ solution (3.01 mmol $H_3Co(CN)_6$) is stirred into a mixture of zinc chloride (1.026 g), 2 g of an 8000 molecular weight bis(dimethoxymethylsilyl)-terminated poly(propylene oxide) (Aldrich catalog #45,041-3), and 20 mL of methanol. A slurry forms, which is stirred for about 10 minutes before 0.25 g of tetraethyl orthosilicate is added. After stirring another 10 minutes, the resulting slurry is added in batches to 10 g of Grade 62, 60–200 mesh silica gel particles, with periodic removal of solvent during the additions using a rotoevaporator (70–75° C./25 inches Hg vacuum). After the addition of the slurry is complete, the product is further stripped on the rotoevaporator at 70–75° C./25 inches Hg vacuum. This is followed by a few minutes at 30 inches Hg vacuum. Further drying overnight at 50° C., the product contains approximately 10.2 wt % metal cyanide catalyst.

J. A supported catalyst made as follows: 89.65 g of a 3.66 wt % solution of $H_3CO(CN)_6$ in methanol (15.05 mmol $H_3Co(CN)_6$) is added over 15 minutes to a stirred mixture of $ZnCl_2$, 25.0 g of an 8000 molecular weight bis(dimethoxymethylsilyl)-terminated poly(propylene oxide) (Aldrich catalog #45,041-3) and 15 g tetraethyl orthosilicate in 150 mL methanol. A slurry forms immediately. After stirring the slurry for 15 minutes, water (5.2 g) is added and the mixture stirred for 5 minutes. The slurry is then added in small batches over about 110 minutes to 150 g silica gel (60–200 mesh particles, 150A pore size, Aldrich catalog #24,3998-1) while the flask is occasionally swirled and shaken to allow the silica to be uniformly wetted. The silica is stripped on a rotoevaporator at 70–75° C. bath temp and 25 inches Hg vacuum once during the coating process, after approximately two-thirds of the total slurry is added. After the slurry is added, the silica is further dried on the rotoevaporator at 70–75° C. bath temp and 25 inches Hg vacuum, then finally at 70–75° C. bath temp (>30 inches Hg vacuum) for approximately 10–15 min. The product is further dried in a vacuum oven at full pump vacuum (90–95° C./>30 in Hg vacuum) for 14 hours. The resultant product contains approximately 4.2% catalyst.

TABLE 1

| Sample Letter | Initiator Type | Mg | Catalyst Type | mg | EO, Grams | Product $M_n$ | PDI |
|---|---|---|---|---|---|---|---|
| A | A | 115.3 | A | 6.1 | .5 | 300 | 1.4 |
| B | B | 112.1 | A | 6.2 | .5 | 290 | 1.45 |
| C | C | 116.1 | A | 6.3 | .5 | 620 | 1.6 |
| D | D | 112.1 | A | 6.2 | .5 | 690 | 1.22 |
| E | E | 116.1 | A | 6.3 | .5 | 530 | 1.26 |
| F | F | 171.7 | A | 6.3 | .5 | N.D. | N.D. |
| G | G | 190.4 | A | .12 | .5 | 420 | 2.62 |
| H | A | 102.9 | A | 1.8 | .5 | 460 | 1.24 |
| I | H | 146.7 | A | 1.37 | .5 | 520 | 1.77 |
| J | I | 133.5 | B | 6.7 | .5 | 470 | 2.13 |
| K | A | 115.3 | B | 6.1 | .5 | 390 | 1.77 |
| L | I | 137.2 | C | 18.1 | .5 | 240 | 2.17 |
| M | I | 164.3 | D | 32.9 | .5 | 300 | 1.67 |
| N | I | 137.7 | E | 28.6 | .5 | 310 | 2.06 |
| O | I | 125.1 | F | 8.03 | .5 | 460 | 1.65 |
| P | I | 131.9 | G | 6.38 | .5 | 320 | 1.63 |
| Q | I | 136.2 | H | 23 | .5 | 460 | 1.3 |
| R | I | 131.3 | I | 16 | .5 | 450 | 1.38 |
| S | J | 130.4 | J | 35.5 | .5 | 390 | 1.72 |
| T | K | 155.0 | A | 6.1 | .443 | 1330 | 1.2 |
| U | L | 232.5 | A | 6.7 | .438 | 1480 | 1.41 |
| V | K | 133.7 | A | 6.9 | .6627EO/.084PO[1] | 1990 | 1.26 |
| W[3] | L | 727.4 | A | 6.0 | .51PO/.7EO[2] | N.D. | N.D. |
| X[4] | K | 422.6 | A | 6.1 | .618PO/0.7EO[2] | N.D. | N.D. |
| Y | M | 179.8 | A | 2.0 | .5 | N.D. | N.D. |
| Z | N | 200.5 | A | 3.7 | .5 | 450 | 1.33 |
| AA | O | 114.9 | A | 3.1 | .5 | N.D. | N.D. |
| BB | P | 203.1 | A | 3.6 | .5 | N.D. | N.D. |
| CC | Q | 119.4 | A | 3.0 | .5 | N.D. | N.D. |
| DD | R | 198.4 | A | 2.0 | .5 | N.D. | N.D. |
| EE | S | 156.1 | A | 2.0 | .5 | N.D. | N.D. |
| FF | T | 195.2 | A | 3.4 | .5 | 460 | 1.11 |

Notes: N.D. is not determined. [1]Ethylene oxide is added and polymerized, followed by removing approximately half of the polymerizate, adding propylene oxide to the remainder and polymerizing. [2]Propylene oxide is added and polymerized, followed by removing approximately half of the polymerizate, adding ethylene oxide to the remainder and polymerizing before the same catalyst. [3]The final product contains 33.1 mole-% polymerized propylene oxide, 64.1 mole-% ethylene oxide and 2.8 mole-% residue from glycerine (from the triol initiator). The product contains 22 mol.-% diol and 78 mole-% triol. 72.4% of the hydroxyl groups are primary hydroxyl. [4]The final product contains 27.2 mole-% polymerized propylene oxide, 70.1 mole-% ethylene oxide and 2.7 mole-% residue from glycerine (from the triol initiator). The product contains 30 mol.-% diol and 70 mole-% triol. 83.2% of the hydroxyl groups primary hydroxyl.

EXAMPLE 15

800 grams of glycerine are added to a reactor with 130.7 grams of a slurry containing 2.34% DMC catalyst dispersed in a 700 Mw polypropylene oxide) triol. The catalyst slurry is prepared according to the general methods described in copending provisional application No. 60/365,666 filed Mar. 19, 2002. The mixture is purged with nitrogen and heated to 110° C. 2650 grams of ethylene oxide are added to the reactor slowly over a 30-hour period. The excess ethylene oxide is stripped out, leaving a ethoxylated triol of about 400 molecular weight. 780 grams for the 400 Mw ethoxylated triol are added to the reactor with an extra 1.57 grams of a powdered zinc hexacyanocobaltate catalyst complex. The material was again stripped with nitrogen and heated to 110° C. Propylene oxide is added to the reactor. The reaction initiates immediately and continues until 6479 grams of PO are added. Analysis of the polyol by NMR shows that it contains 8% polymerized ethylene oxide and 31.3 ppm residual Co. Molecular weight by GPC is 3690 with a polydispersity of 1.26.

What is claimed is:

1. A process for preparing a block polyether, comprising forming a mixture of an initiator compound having one or more oxyalkylatable groups, an initial charge of ethylene oxide and a metal cyanide catalyst complex, and subjecting the mixture to conditions sufficient to ethoxylate the oxyalkalatable groups of the initiator, and feeding another alkylene oxide or mixture of another alkylene oxide and a copolymerizable monomer to the reactor under polymerization conditions once the catalyst has been activated and the initial charge of ethylene oxide has begun to polymerize.

2. The process of claim 1 wherein at least three moles of ethylene oxide are polymerized per equivalent of initiator compound before feeding another alkylene oxide or mixture of another alkylene oxide and a copolymerizable monomer to the reactor.

3. The process of claim 2 wherein the catalyst is represented by the general formula:

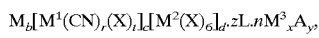

wherein M is a metal ion that forms an insoluble precipitate with the $M^1(CN)_r(X)_t$ group and which has at least one water soluble salt;

$M^1$ and $M^2$ are transition metal ions that may be the same or different;

each X independently represents a group other than cyanide that coordinates with an $M^1$ or $M^2$ ion;

L represents an organic complexing agent;

$M^3_xA_y$ represents a water-soluble salt of metal ion $M^3$ and anion A, wherein $M^3$ is the same as or different than M;

b and c are positive numbers that, together with d, reflect an electrostatically neutral complex;

d is zero or a positive number;

x and y are numbers that reflect an electrostatically neutral salt;

r is from 4 to 6; t is from 0 to 2;

z is zero or a positive number and n is a positive number indicating the relative quantities of the complexing agent and $M_xA_y$, respectively.

4. The process of claim 1 wherein the catalyst is activated in the presence of ethylene oxide.

5. The process of claim 1 wherein said initial charge of ethylene oxide is polymerized to form an activated poly(oxyethylene) intermediate, and said activated poly(oxyethylene) intermediate is stored and/or transported prior to feeding another alkylene oxide or mixture of another alkylene oxide and a copolymerizable monomer to form the block copolymer.

6. A block copolymer made according to the process of claim 1.

7. A block copolymer made according to the process of claim 5.

8. A block copolymer containing internal blocks of polymerized ethylene oxide and external blocks of another polymerized alkylene oxide, wherein said internal and external blocks are prepared using a DMC catalyst.

9. The process of claim 1, wherein after said initial charge of ethylene oxide has begun to polymerize, the catalyst is deactivated, the resulting oxyalkylated material is stored and/or transported, and then additional DMC catalyst and at least one other alkylene oxide are added to the oxyalkylated material, and said other alkylene oxide is polymerized to form a block copolymer containing internal poly(oxyethylene) groups and external blocks of said other alkylene oxide in polymerized form.

* * * * *